United States Patent
Masi et al.

(10) Patent No.: US 8,482,142 B2
(45) Date of Patent: Jul. 9, 2013

(54) ULTRACAPACITOR INTERFACE IN WIND TURBINE AND RING GENERATOR

(75) Inventors: James Masi, Cape Elizabeth, ME (US); Walter M. Presz, Jr., Wilbraham, MA (US); Stanley Kowalski, III, Wilbraham, MA (US); Thomas J. Kennedy, III, Wilbraham, MA (US)

(73) Assignee: FloDesign Wind Turbine Corp., Waltham, MA (US)

( * ) Notice: Subject to any disclaimer, the term of this patent is extended or adjusted under 35 U.S.C. 154(b) by 526 days.

(21) Appl. No.: 12/629,714

(22) Filed: Dec. 2, 2009

(65) Prior Publication Data

US 2010/0133853 A1    Jun. 3, 2010

Related U.S. Application Data

(60) Provisional application No. 61/119,078, filed on Dec. 2, 2008.

(51) Int. Cl.
*F03D 9/00* (2006.01)

(52) U.S. Cl.
USPC .............................. 290/44; 290/55

(58) Field of Classification Search
USPC ................. 290/44, 55; 310/266, 267
See application file for complete search history.

(56) References Cited

U.S. PATENT DOCUMENTS

| | | | |
|---|---|---|---|
| 4,720,640 A * | 1/1988 | Anderson et al. | 290/43 |
| 6,659,719 B2 * | 12/2003 | Angelis | 415/211.2 |
| 6,812,587 B2 | 11/2004 | Gilbreth et al. | |
| 7,045,913 B2 | 5/2006 | Ebrahim et al. | |
| 7,116,010 B2 | 10/2006 | Lasseter et al. | |
| 7,303,369 B2 * | 12/2007 | Rowan et al. | 415/4.2 |
| 7,531,933 B2 | 5/2009 | Miyata et al. | |
| 7,619,332 B2 | 11/2009 | Kimura et al. | |
| 7,964,978 B1 * | 6/2011 | Weissmann | 290/44 |
| 2003/0137149 A1 * | 7/2003 | Northrup et al. | 290/44 |
| 2003/0227172 A1 * | 12/2003 | Erdman et al. | 290/44 |
| 2007/0040385 A1 * | 2/2007 | Uchiyama | 290/44 |
| 2008/0150484 A1 | 6/2008 | Kimball et al. | |
| 2008/0232957 A1 | 9/2008 | Presz et al. | |
| 2008/0258469 A1 * | 10/2008 | Stephens et al. | 290/55 |
| 2009/0056968 A1 * | 3/2009 | Bertelsen | 174/2 |
| 2009/0148655 A1 * | 6/2009 | Nies | 428/99 |
| 2010/0133839 A1 * | 6/2010 | Bridwell | 290/52 |

(Continued)

FOREIGN PATENT DOCUMENTS

EP   1 885 047 B1   12/2008
JP   2007120393     5/2007

(Continued)

OTHER PUBLICATIONS http://en.wikipedia.org/wiki/Ultracapacitor, "Electric Double-Layer Capacitor", Oct. 22, 2009, 7 pages.

(Continued)

Primary Examiner — Tho D Ta
(74) Attorney, Agent, or Firm — McCarter & English, LLP

(57) ABSTRACT

A mixer-ejector wind turbine uses an ultracapacitor system to store power from the variable generation of power by a permanent magnet generator. The system takes advantage of the MEWT area ratio, the higher velocity at the outer radius of the turbine, and the ability of the ultracapacitor system to store almost all of the input charge.

20 Claims, 15 Drawing Sheets

U.S. PATENT DOCUMENTS

| | | | |
|---|---|---|---|
| 2010/0148515 A1* | 6/2010 | Geddry et al. | 290/55 |
| 2011/0031760 A1* | 2/2011 | Lugg | 290/55 |
| 2011/0291413 A1* | 12/2011 | Wamble et al. | 290/44 |

FOREIGN PATENT DOCUMENTS

| | | |
|---|---|---|
| WO | WO 2004/059814 | 7/2004 |
| WO | WO 2007/132303 | 11/2007 |
| WO | WO 2008/118405 A2 | 10/2008 |
| WO | WO 2008/130940 A1 | 10/2008 |
| WO | 2009129309 A3 | 5/2010 |

OTHER PUBLICATIONS http://en.wikipedia.org/wiki/Permanent_magnet_synchronous_generator, "Permanent Magnet Synchronous Generator", Oct. 22, 2009, 2 pages.

PCT International Search Report for International Application No. PCT/US2009/066423, Date of Report Feb. 4, 2011, 3 pages.

http://en.wikipedia.org/wiki/Permanent_magnet_synchronous_generator, "Permanent Magnet Synchronous Generator", downloaded Oct. 22, 2009, 2 pages.

http://en.wikipedia.org/wiki/Ultracapacitor; "Electric Double-Layer Capacitor", downloaded Oct. 22, 2009, 7 pages.

International Preliminary Report on Patentability for International Application No. PCT/US2209/066423, issued Jun. 7, 2011, 6 pages.

International Preliminary Report on Patentability for International Application No. PCT/US2010/040750, Jan. 12, 2012, 8 pages.

International Search Report for International Application No. PCT/US2009/066423, Feb. 14, 2011, 3 pages.

International Search Report for International Application No. PCT/US2010/040750, mailed Apr. 4, 2012, 4 pages.

Examination Report for EP Appln. No. 09 764 964.4 from the European Patent Office, dated Apr. 8, 2013 (6 pages).

Abbey, C. and Joos, G., "Supercapacitor Energy Storage for Wind Energy Applications," IEEE Transactions on Industry Applications 43(3): 769-776 (Jun. 30, 2007).

* cited by examiner

ULTRACAPACITOR INTERFACE IN WIND TURBINE AND RING GENERATOR

BACKGROUND

This application claims priority to U.S. Provisional Patent Application Ser. No. 61/119,078, filed Dec. 2, 2008. That application is hereby fully incorporated by reference herein in its entirety.

The present disclosure relates to systems which can be used with a mixer-ejector wind turbine. In particular, a ring generator based on a rotor/stator assembly modified to serve as a permanent magnet generator and an ultracapacitor bank for storing the electricity produced are combined with a mixer-ejector wind turbine to produce an efficient power generation system. Methods of making/using such systems are also disclosed.

The generation of electrical power is a very short time based commodity. Essentially, without the ability to store the generated power, it must be used as it is produced. Sophisticated software is utilized by Regional Transmission Organizations (RTO's) to insure minute-to-minute reliable operation of a geographical region's bulk electric power system, providing centrally dispatched direction for the generation and flow of electricity across the region's interstate high-voltage transmission lines and thereby ensuring the constant availability of electricity for the residents and businesses of the area.

Intermittent power sources, such as wind power, produce power at irregular times. The production time of the power may not coincide with demand. It would be desirable to store as much of the power produced by a wind turbine so that it could be utilized at a later time, smoothing out the production and use curves of generated and distributed power.

The ability to store power within the electrical grid provides flexibility to the region's bulk electrical system. A power "accumulator" may be used to increase this flexibility. Currently, this type of power accumulator is a storage device such as a bank of batteries or pumped water storage.

Pumped water storage can require up to 375,000 gallons of water per second, for example as used at by the Niagara Power Project which is part of the New York Power Authority. Such large-scale projects require massive amounts of water and the geological features to use it efficiently to produce power. These features mean that pumped water storage is unlikely to be a practical energy storage method at those locations for optimum wind power production.

Wind turbines usually contain a propeller-like device, termed the "rotor", which is faced into a moving air stream. As the air hits the rotor, the air produces a force on the rotor in such a manner as to cause the rotor to rotate about its axis. The rotor is connected to either an electricity generator or mechanical device through linkages such as gears, belts, chains or other means. Such turbines are used for generating electricity and powering batteries. They are also used to drive rotating pumps and/or moving machine parts. It is very common to find wind turbines in large electricity generating "wind farms" containing multiple such turbines in a geometric pattern designed to allow maximum power extraction with minimal impact of each such turbine on one another and/or the surrounding environment.

The ability of a rotor to convert fluid power to rotating power, when placed in a stream of very large width compared to its diameter, is limited by the well documented theoretical value of 59.3% of the oncoming stream's power, known as the "Betz" limit as documented by A. Betz in 1926. This productivity limit applies especially to the traditional three-bladed axial wind turbine.

It would be desirable to provide power generation systems and power storage systems suitable for use with wind turbines.

BRIEF DESCRIPTION

The present disclosure relates to a mixer-ejector wind turbine, or MEWT, that can consistently deliver levels of power well above the Betz limit. Such a wind turbine can also employ a ring generator and an ultracapacitor bank to provide an efficient means of power generation and energy storage.

Disclosed in some embodiments is a power generation system, comprising: a wind turbine, the turbine comprising: a mixer shroud enclosing a rotor/stator assembly, the mixer shroud comprising a ring of mixer lobes located along a downstream end and downstream of the rotor/stator assembly; the rotor/stator assembly including a rotor and a stator, the stator having a phase winding, the rotor having a central ring, an outer ring, a plurality of rotor blades extending between the central ring and the outer ring, and a plurality of permanent magnets on the outer ring; and an ultracapacitor bank electrically connected to the wind turbine.

The mixer shroud may have an airfoil shape. The power generation system may further comprise a rectification unit located between the wind turbine and the ultracapacitor bank.

The permanent magnets generally comprise a rare earth element, and in particular embodiments are $Nd_2Fe_{14}B$ magnets.

The power generation system may further comprise a dielectric coating on the wind turbine. The dielectric coating can be located on an interior of a nacelle, or cover the wind turbine. The dielectric coating may comprise a resin and a dielectric material. Alternatively, the dielectric coating may comprise an oxide of aluminum, titanium, or yttrium.

The power generation system may further comprise a lightning control system.

The stator, in some particular designs, has three phase windings connected in series.

The plurality of permanent magnets are located along a rear end of the outer ring in some other embodiments.

Each mixer lobe may have an inner trailing edge angle and an outer trailing edge angle, and the inner angle and the outer angle are independently in the range of 5 to 65 degrees.

The wind turbine may further comprise an ejector shroud, the downstream end of the mixer shroud extending into an inlet end of the ejector shroud. Sometimes, the ejector shroud further comprises a ring of mixer lobes along a downstream end. Alternatively, the ejector shroud can have an airfoil shape.

Also disclosed in embodiments is a ring generator for a wind turbine, comprising a stator surrounding a rotor; the stator having a phase winding, the rotor having a central ring, an outer ring, a plurality of rotor blades extending between the central ring and the outer ring, and a plurality of permanent magnets on the outer ring.

The ratio of a swept area of the rotor blades to an area inside the permanent magnets may be about 1:1.

Also disclosed is a process for producing energy using a wind turbine having a ring generator and an optional ultracapacitor bank. The ring generator comprises a stator surrounding a rotor. The stator has a phase winding. The rotor has a central ring, an outer ring, a plurality of rotor blades extending between the central ring and the outer ring, and a plurality of permanent magnets on the outer ring. The wind turbine having such a ring generator is placed in a fluid stream to generate energy; and the energy may be optionally collected in an ultracapacitor bank.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
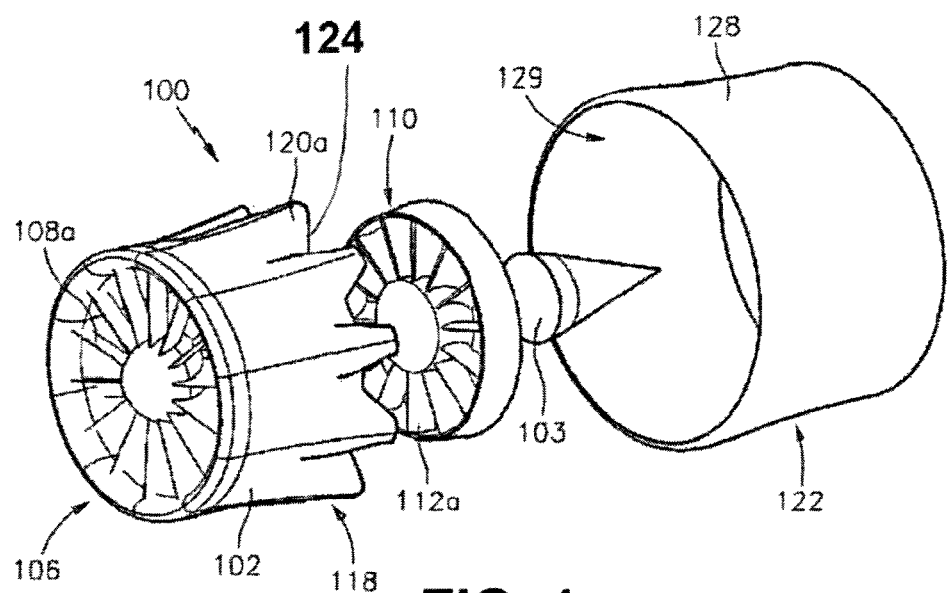
FIG. 1 is an exploded view of an exemplary MEWT of the present disclosure.
Figure 2:
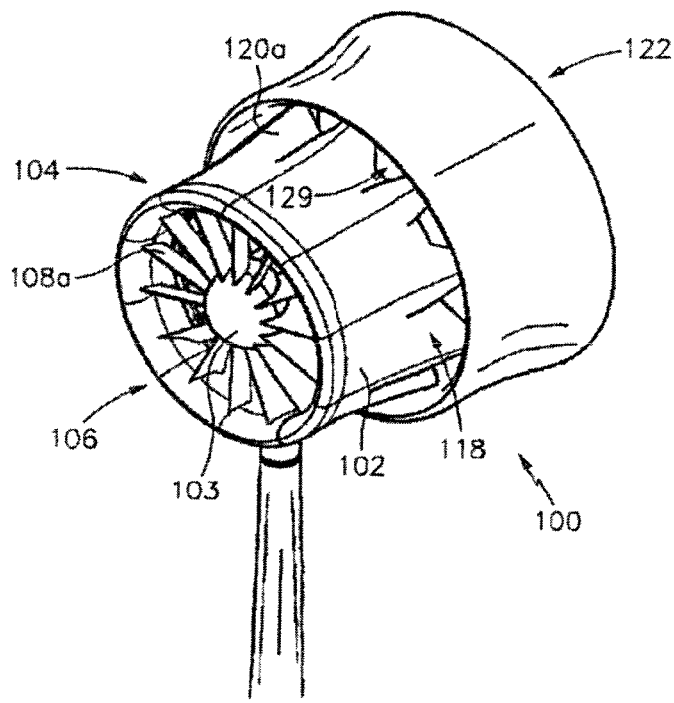
FIG. 2 is a front perspective view of an exemplary MEWT of the present disclosure attached to a support tower.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range of "from about 2 to about 10" also discloses the range "from 2 to 10."

The present disclosure relates to mixer-ejector wind turbines (MEWTs) and power generation systems including such turbines. The turbines may have a particular structure and include a rotor/stator assembly for energy generation. They can also be connected to an ultracapacitor bank for storing the energy produced by the wind turbines. Please note that the present disclosure may refer to energy and power interchangeably.

In embodiments as seen in FIGS. 1-4, the MEWT 100 is an axial flow wind turbine. An aerodynamically contoured mixer shroud 102 surrounds an aerodynamically contoured nacelle or center body 103, which is located within and is attached to the mixer shroud 102. A turbine stage 104 surrounds the center body 103. The turbine stage comprises a forward ring 106 with vanes 108a and an impeller 110 having impeller blades 112a downstream and "in-line" with the forward ring vanes. The impeller blades are attached and held together by inner and outer rings or hoops mounted on the center body 103. The mixer 118 has a ring of mixer lobes 120a on a downstream end 124 of the mixer shroud 102. The mixer lobes 120a extend downstream beyond the impeller blades 112a. An ejector 122 comprises an ejector shroud 128 surrounding the ring of mixer lobes 120a on the mixer shroud 102. Put another way, the mixer lobes 120a extend downstream and into an inlet end 129 of the ejector shroud 128.

Figure 5:
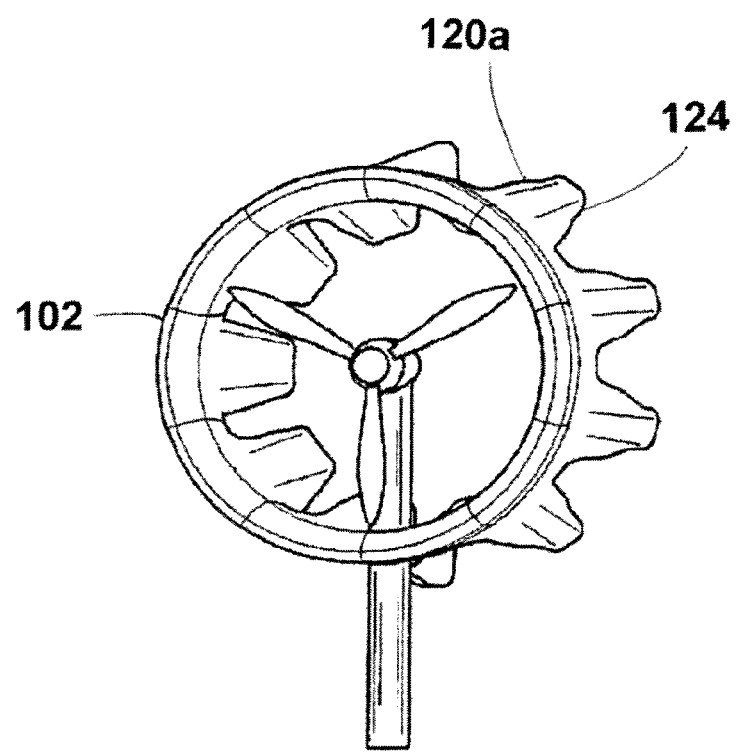
FIG. 5 shows another exemplary embodiment of a MEWT having a mixer shroud with mixer lobes on the downstream end thereof.

FIG. 5 shows another embodiment where the wind turbine comprises only a mixer shroud 102 and does not include an ejector shroud. Again, the mixer shroud has a ring of mixer lobes 120a on the downstream end 124.

Figure 6:
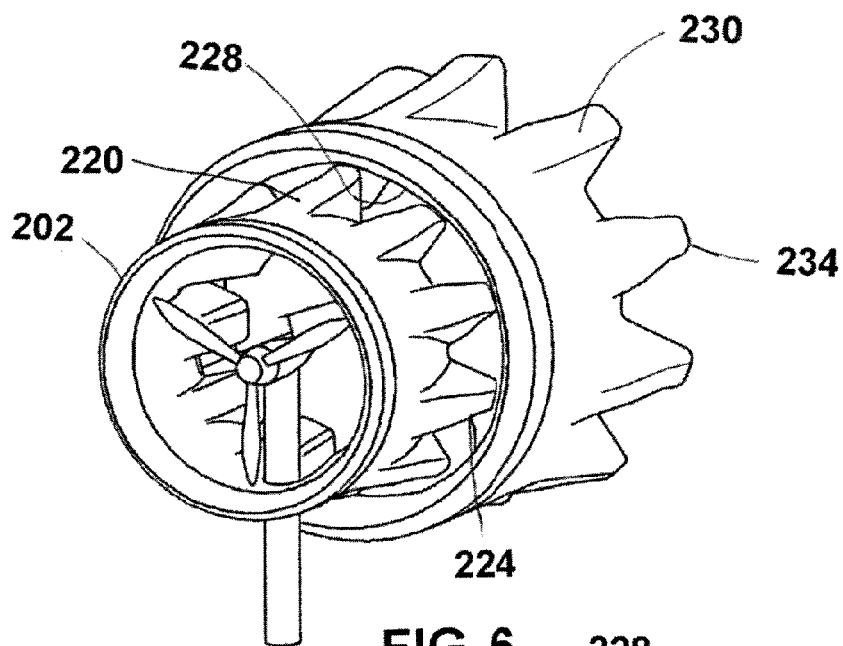
FIG. 6 is another exemplary embodiment of a MEWT having a mixer shroud and an ejector shroud, both shrouds having mixer lobes on their downstream or rear ends.
Figure 7:
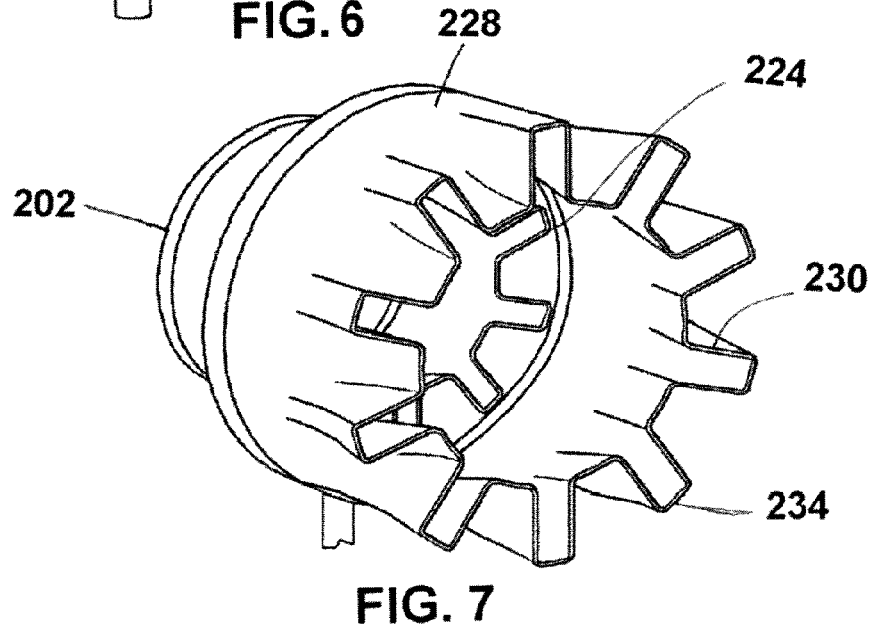
FIG. 7 is a side cross-sectional view of the MEWT of FIG. 6.
Figure 8:
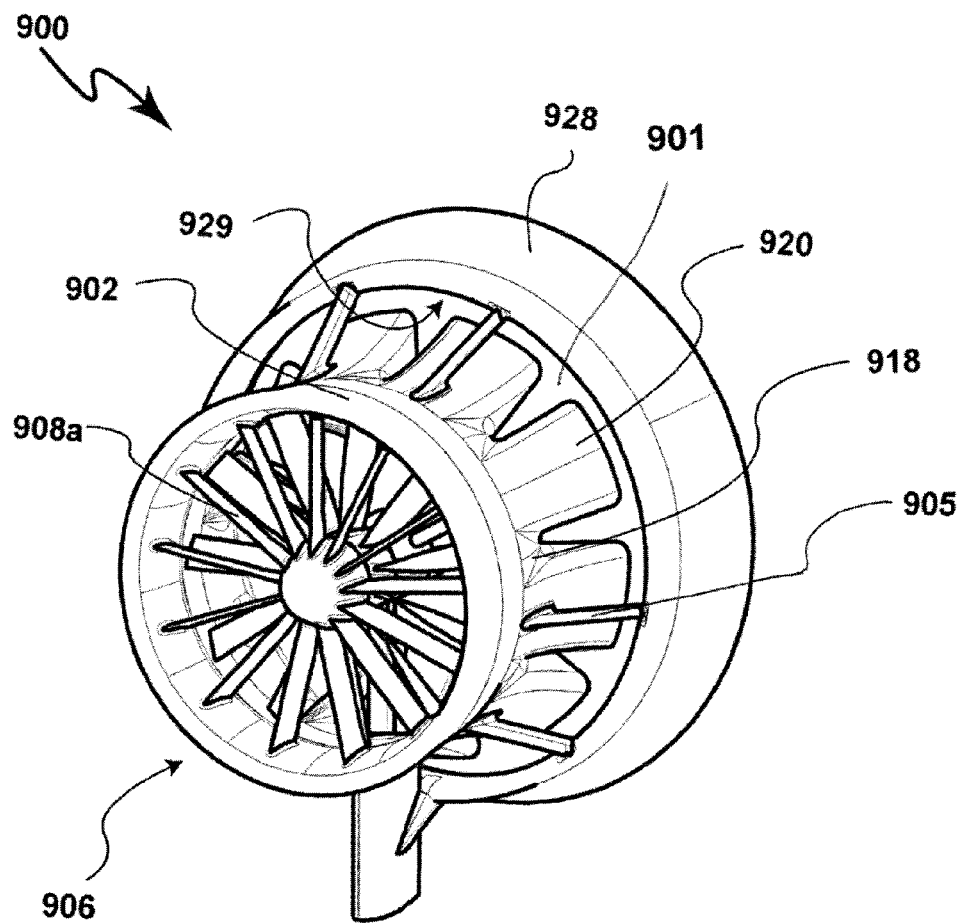
FIG. 8 is a front perspective view of another exemplary embodiment of a MEWT.

FIG. 6 and FIG. 7 show another embodiment where both the mixer shroud 202 and the ejector shroud 228 have mixer lobes 220, 230 on their respective downstream ends 224, 234.

Figure 3:
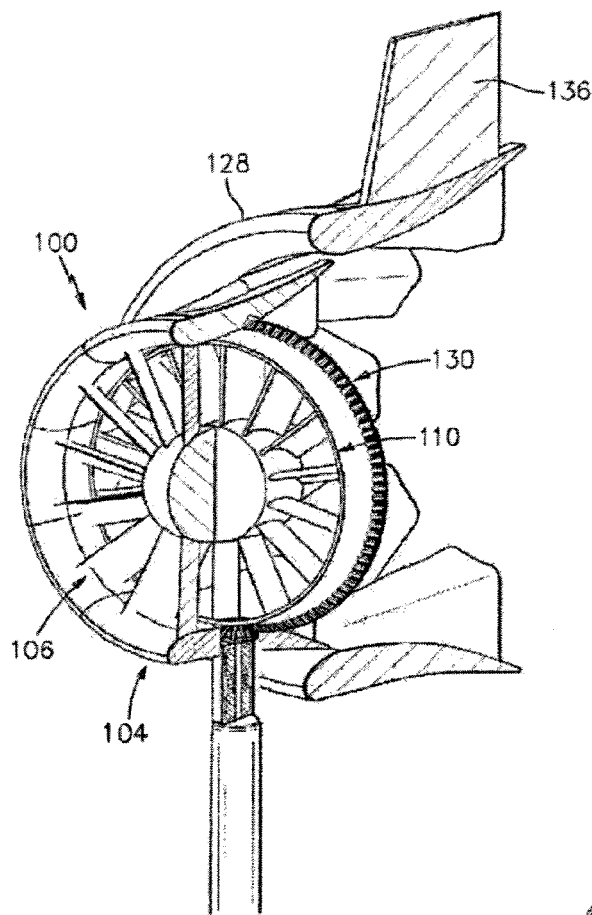
FIG. 3 is a front perspective view of an exemplary MEWT of the present disclosure cut away to show interior structure, such as a power takeoff attached to the rotor.
Figure 4:
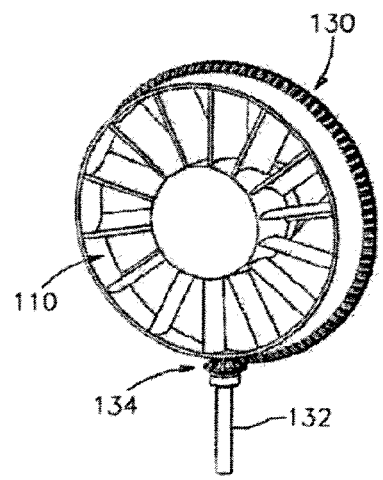
FIG. 4 is a front perspective view of just the rotor, power takeoff, and support shaft from FIG. 3.

As seen in FIG. 3, the mixer shroud 102 and ejector shroud 128 have an aerodynamic profile, i.e. are contoured in an airfoil shape or are cambered to increase fluid flow through the impeller 110.

In embodiments, the area ratio of the ejector pump 122, as defined by the ejector shroud 128 exit area over the mixer shroud 102 exit area, can be between 1.5 and 3.0. The number of mixer lobes 120a, 230 can be between 6 and 14. Each lobe may have inner and outer trailing edge angles between 5 and 65 degrees, as explained further herein. The height-to-width ratio of the mixer lobes may be between 0.5 and 4.5. The mixer penetration will be between 50% and 80%, i.e. the mixer shroud 102 may extend into the ejector shroud 128 for a given percentage of the length of the ejector shroud. The center body 103 plug trailing edge angles may be thirty degrees or less. The length to diameter (L/D) ratio of the overall MEWT 100 may be between 0.5 and 1.25.

Optional features of the MEWT can include: a vertical support shaft 132 with a rotatable coupling at 134 (see FIG. 4) for rotatably supporting the MEWT 100, which is located forward of the center-of-pressure location on the MEWT for self-aligning the MEWT; a power takeoff 130; and a selfmoving vertical stabilizer or "wing-tab" 136 (see FIG. 3), affixed to upper and/or lower surfaces of ejector shroud 128, to align the turbine with the direction of the fluid stream.

FIGS. 8-11 illustrate another embodiment of a MEWT. The MEWT 900 in FIG. 8 has a stator 908a and a rotor 910 configuration for power extraction. The mixer shroud 902 surrounds the rotor 910 and is supported by or connected to the blades of the stator 908a. The mixer shroud 902 is in the shape of an airfoil with the suction side (i.e. low pressure side) on the interior of the shroud. An ejector shroud 928 is coaxial with the mixer shroud 902 and is supported by connectors 905 extending between the two shrouds. An annular area 901 is formed between the two shrouds. The rear end of the mixer shroud 902 is shaped to form two different sets of mixing lobes 918, 920. High energy mixing lobes 918 extend inward towards the central axis of the mixer shroud 902, which low energy mixing lobes 920 extend outwards away from the central axis.

Free stream air 906 passing through the stator 908a has at least a portion of its energy extracted by the rotor 910. High energy air 929 bypasses the stator 908a and is brought in behind the mixer shroud 902 by the high energy mixing lobes 918. The low energy mixing lobes 920 cause the low energy air downstream from the rotor 910 to be mixed with the high energy air 929.

Figure 9:
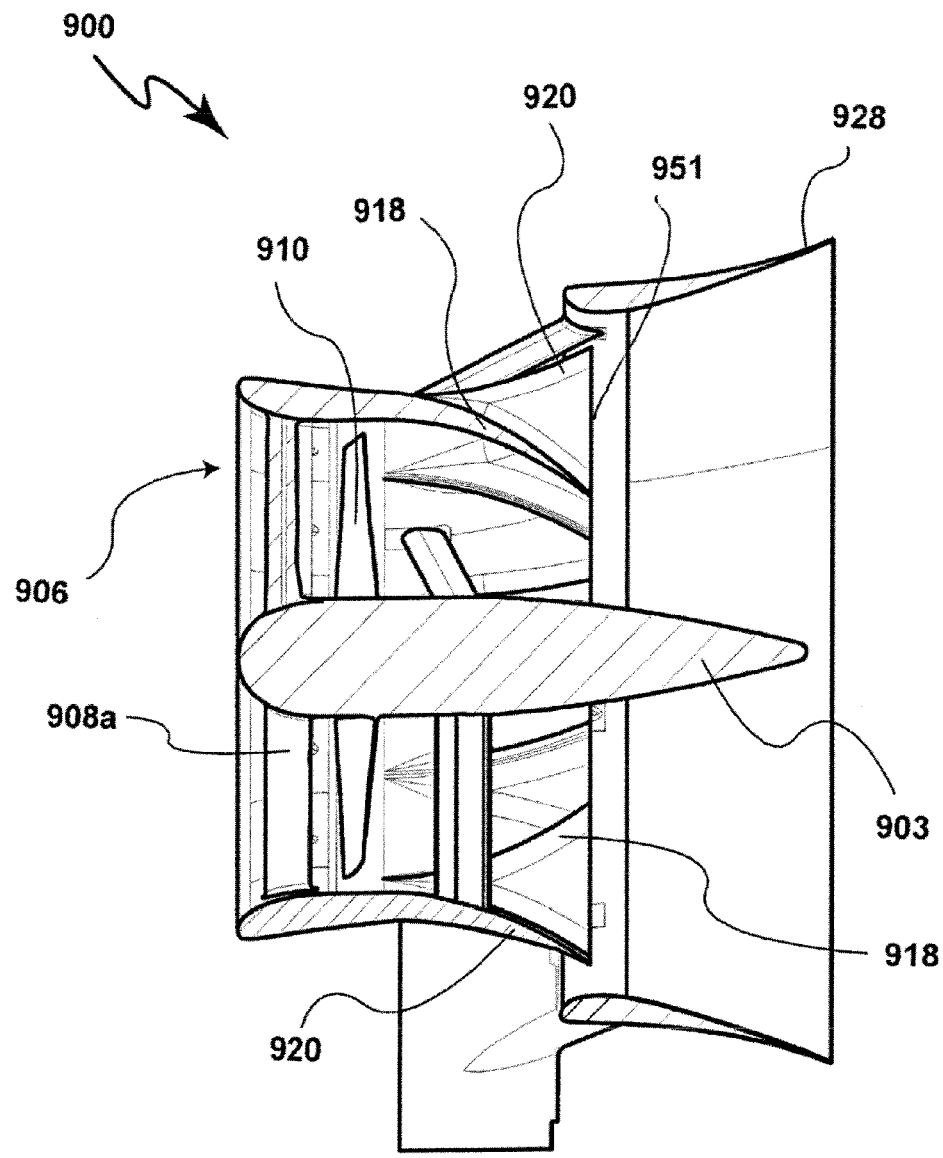
FIG. 9 is a side cross-sectional view of the MEWT of FIG. 8.

The nacelle 903 and the trailing edges of the low energy mixing lobes 920 and the trailing edge of the high energy mixing lobes 918 may be seen in FIG. 9. The ejector shroud 928 is used to draw in the high energy air 929.

Figure 10:
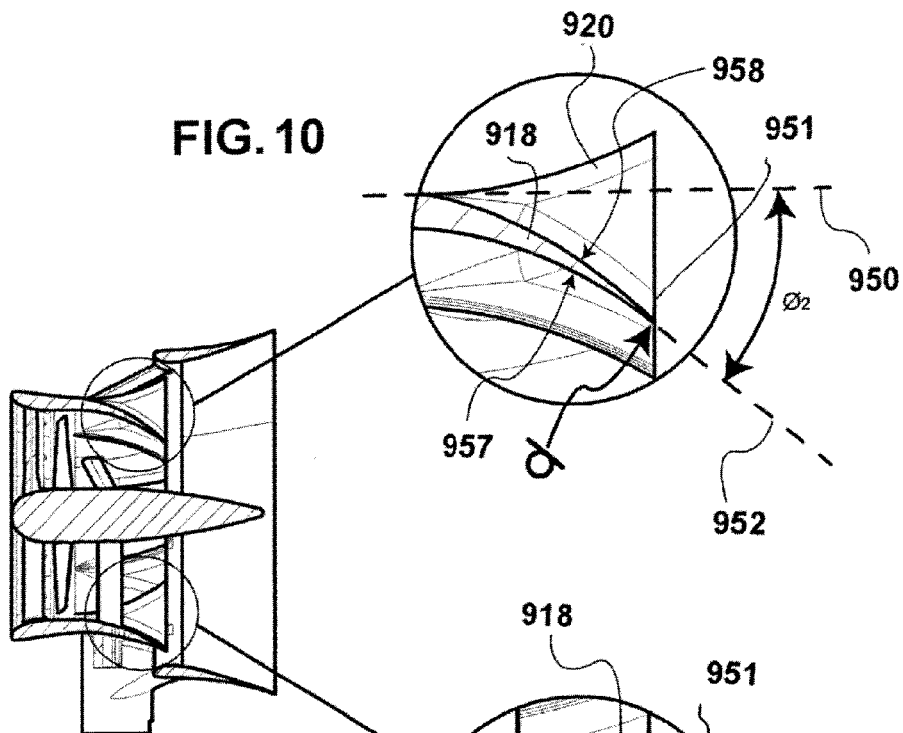
FIG. 10 and FIG. 11 are magnified views of the mixing lobes of the MEWT of FIG. 9.

In FIG. 10, a tangent line 952 is drawn along the interior trailing edge 957 of the high energy mixing lobe 918. A rear plane 951 of the mixer shroud 902 is present. A centerline 950 is formed tangent to the rear plane 951 that intersects the point where a low energy mixing lobe 920 and high energy mixing lobes 918 meet. An angle $Ø_2$ is formed by the intersection of tangent line 952 and centerline 950. This angle $Ø_2$ is between 5 and 65 degrees. Put another way, a high energy mixing lobe 918 forms an angle $Ø_2$ between 5 and 65 degrees relative to the mixer shroud 902.

Figure 11:
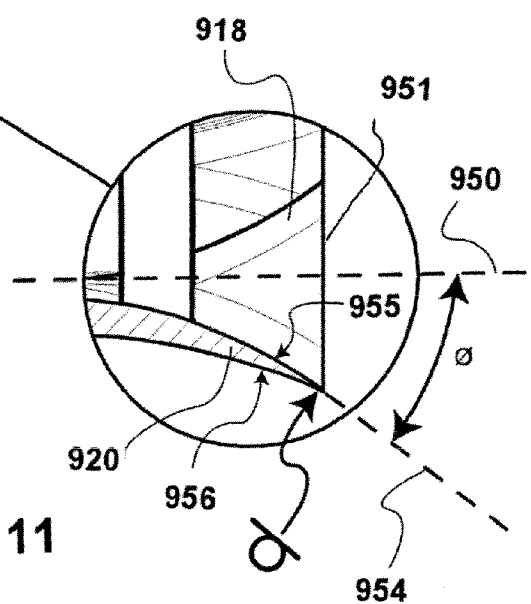

In FIG. 11, a tangent line 954 is drawn along the interior trailing edge 955 of the low energy mixing lobe 920. An angle Ø is formed by the intersection of tangent line 954 and centerline 950. This angle Ø is between 5 and 65 degrees. Put another way, a low energy mixing lobe 920 forms an angle Ø between 5 and 65 degrees relative to the mixer shroud 902.

Figure 12:
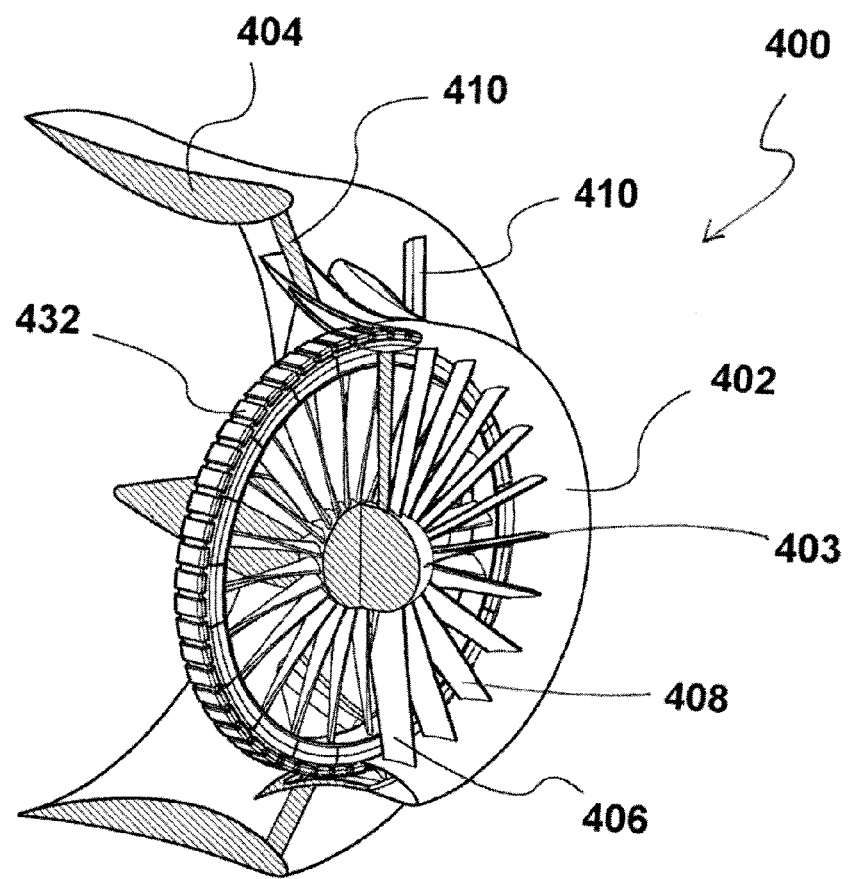
FIG. 12 is a cutaway view of another exemplary embodiment of a MEWT showing the stator portion of a ring generator.
Figure 13:
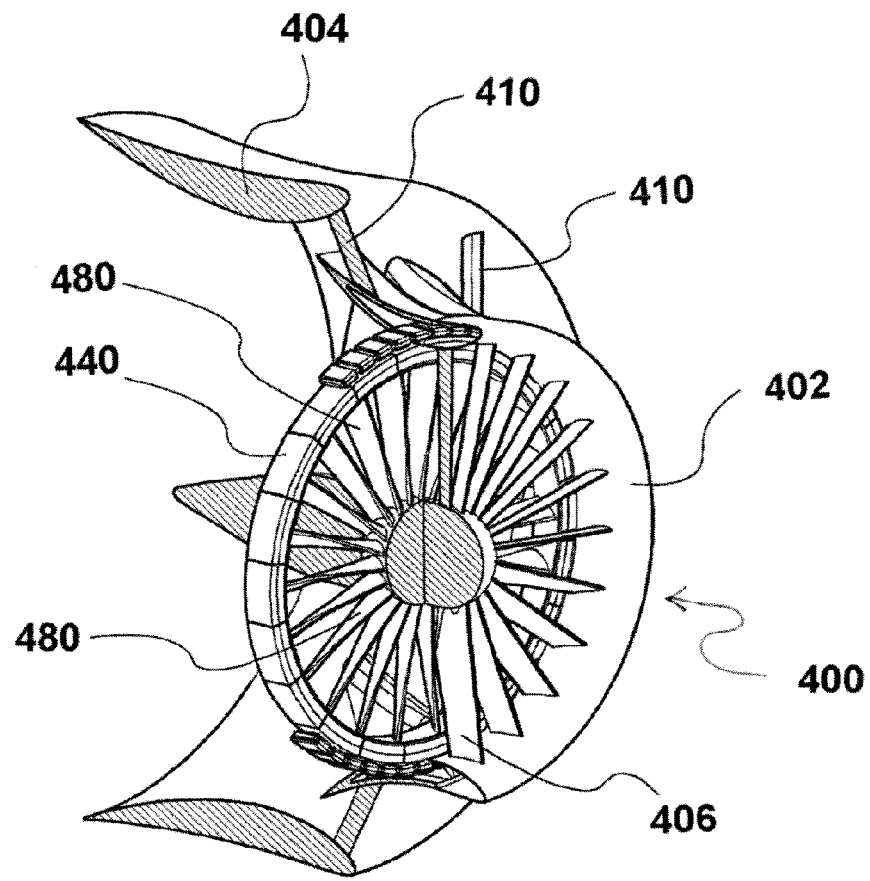
FIG. 13 is a cutaway view of another exemplary embodiment of a MEWT showing the rotor portion of a ring generator.
Figure 14:
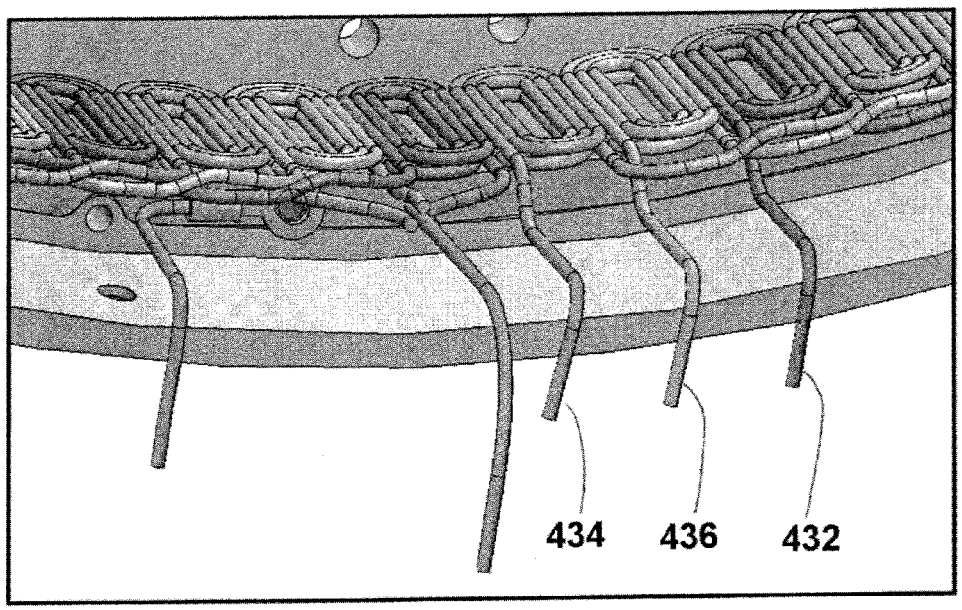
FIG. 14 is a closeup view of the stator portion of a ring generator having three phase windings.

FIG. 12 and FIG. 13 show another exemplary embodiment of a wind turbine 400 of the present disclosure. The turbine 400 comprises a mixer shroud 402 and an ejector shroud 404. The mixer shroud 402 encloses a rotor/stator assembly 406. Stator vanes 408 run between the mixer shroud 402 and a nacelle or center body 403. Attachment struts 410 join or connect the mixer shroud 402 with the ejector shroud 404.

The rotor/stator assembly 406 operates as a permanent ring generator. With reference to FIGS. 12-19, permanent magnets 440 are mounted on a rotor 420. One or more phase windings 432 are mounted in the stator 430. As the rotor rotates, a constant rotating magnetic field is produced by the magnets 440. This magnetic field induces an alternating current (AC) voltage in the phase windings 432 to produce electrical energy which can be captured. One advantage of the permanent ring generator compared to an induction generator is that the induction generator requires power from the electrical grid itself to form a magnetic field. In contrast, the permanent magnet generator does not need power from the grid to produce electricity.

Figure 18:
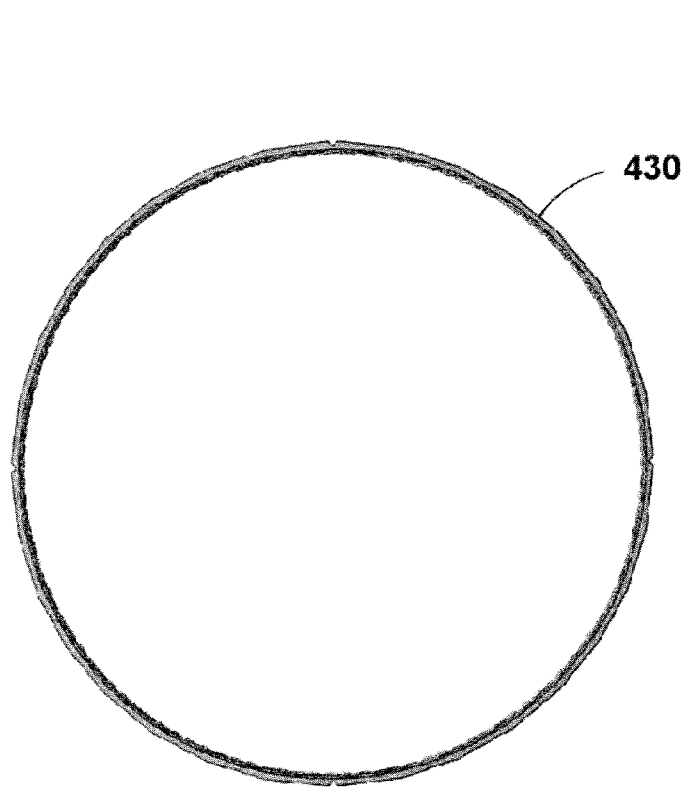
FIG. 18 is the front view of an exemplary stator.
Figure 19:
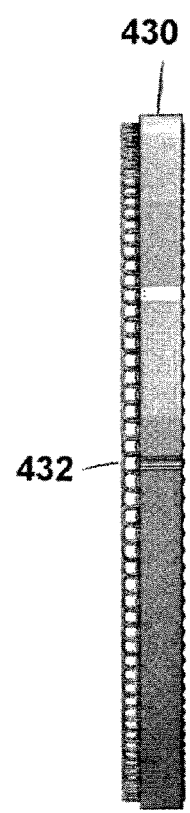
FIG. 19 is the side view of an exemplary stator.

FIG. 12 is cut away to show the phase windings 432. Each phase winding is comprised of a series of coils. In particular embodiments such as that depicted in FIG. 14, the stator has three phase windings 432, 434, 436 connected in series for producing three-phase electric power. Each winding contains 40 wound coils in series spaced by nine degrees, so that the combination of three phase windings covers the 360° circumference of the stator. FIG. 18 and FIG. 19 show the assembled stator 430 from the front and side, respectively.

Figures 16, 17:
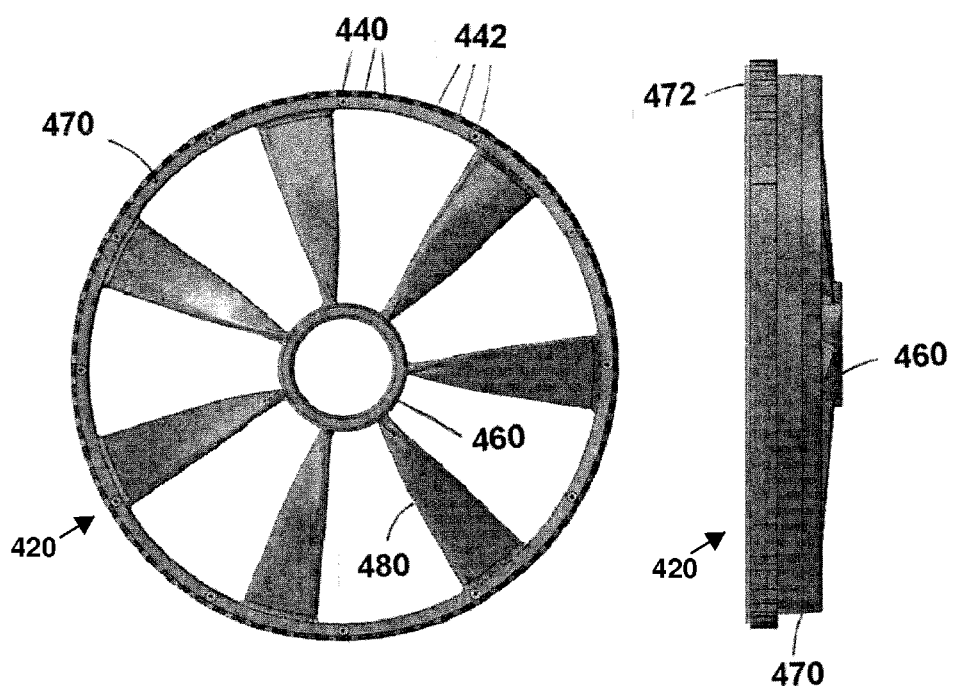
FIG. 16 is the front view of an exemplary rotor.
FIG. 17 is the side view of an exemplary rotor.

FIG. 13 is cut away to show the permanent magnets 440. Referring now to FIG. 16 and FIG. 17, the rotor 450 contains a central ring 460 and an outer ring 470. Rotor blades 480 extend between the central ring 460 and the outer ring 470, connecting them together. Referring back to FIG. 12, the center body 403 extends through the central ring 460 to support the rotor 450 and fix its location relative to the mixer shroud 402.

A plurality of permanent magnets 440 is located on the outer ring 470. The magnets are generally evenly distributed around the circumference of the rotor and along the outer ring 470. As seen in FIG. 17, in embodiments the magnets are located along a rear end 472 of the outer ring. In particular embodiments, there are 80 permanent magnets spaced every 4.5 degrees. The magnet poles are oriented radially on the outer ring, i.e. one pole being closer to the central ring than the other pole. The magnets are arranged so that their poles alternate, for example so that a magnet with its north pole oriented outward is surrounded by two poles with their south pole oriented outward. The magnets 440 are separated by potting material 442 which secures the magnets to the rotor 450.

In embodiments, the permanent magnets are rare earth magnets, i.e. are made from alloys of rare earth elements. Rare earth magnets produce very high magnetic fields. In embodiments, the permanent magnets are neodymium magnets, such as $Nd_2Fe_{14}B$.

Figure 15:
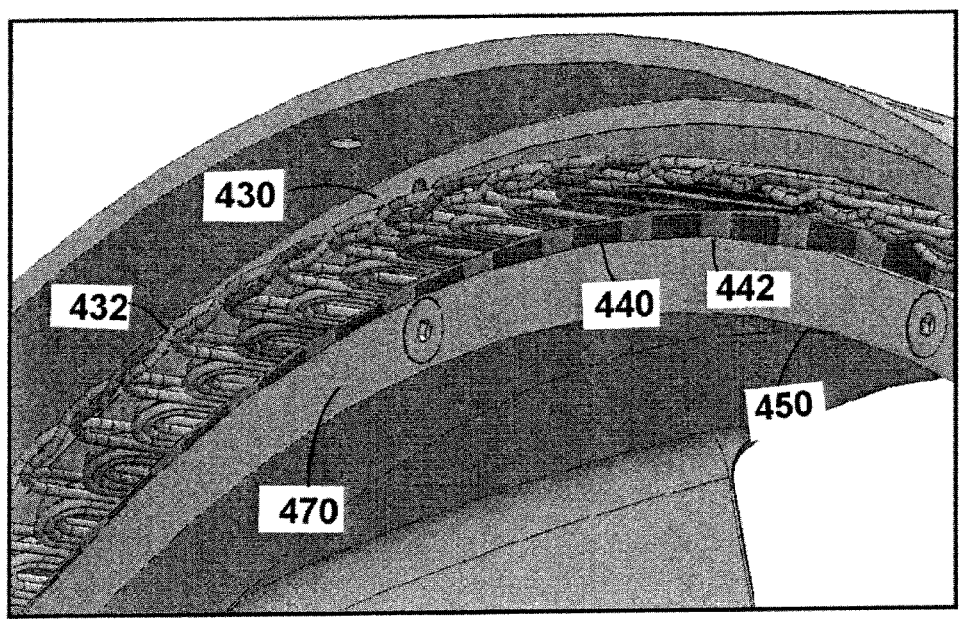
FIG. 15 is a closeup view showing the rotor and stator of a ring generator in relation to each other.

FIG. 15 is an enlarged view showing the rotor 450 and stator 430 and their relationship to each other.

One advantage of a mixer-ejector wind turbine as described herein compared to traditional three-bladed horizontal axis wind turbines is that the blades of a typical turbine may be as much as 50 meters long or longer. This results in a large swept area for the blades. However, the area enclosed by the permanent magnets is much smaller. Because the ratio of the area for the blades to the area for the magnets is very high, the ring generator is unable to turn as efficiently as it otherwise could. However, the ratio of the area for the MEWT is about 1:1, which allows for greater efficiency and greater power generation. Another advantage is that the MEWT has a lower "cut-in" speed, i.e. the rotor on the MEWT will start turning and generating energy at lower wind speeds. Normally, due to the intermittent generation of the wind turbine, the turbine is not directly connected to an electrical grid because the fluctuations in electricity production would inject voltage and frequency disturbances into the grid.

Thus, in embodiments, an ultracapacitor bank is electrically connected to the wind turbine to store the energy produced by the wind turbine and provide the energy which desired. The ultracapacitor bank is located between the wind turbine and the electrical grid. A rectification unit is located between the wind turbine and the ultracapacitor bank as well. This unit acts as a "gate" for one-way directional flow of electrical current from the wind turbine to the ultracapacitor bank. See the discussion of FIG. 21 further herein.

Like batteries, ultracapacitors are energy storage devices. Ultracapacitors are true capacitors in that energy is stored via charge separation at the electrode-electrolyte interface, and they can withstand hundreds of thousands of charge/discharge cycles without degrading.

Ultracapacitors use electrolytes and configure various-sized cells into modules to meet the power, energy, and voltage requirements for a wide range of applications. However, batteries store charges chemically, whereas ultracapacitors store them electrostatically.

An ultracapacitor, also known as a double-layer capacitor, polarizes an electrolytic solution to store energy electrostatically (i.e. no chemical reactions are involved in the energy storage mechanism). This mechanism is highly reversible, and allows the ultracapacitor to be charged and discharged hundreds of thousands of times, notably at rates higher than a battery. This type of storage device allows for flexibility of storage while also allowing for small size and ease of location.

Figure 20:
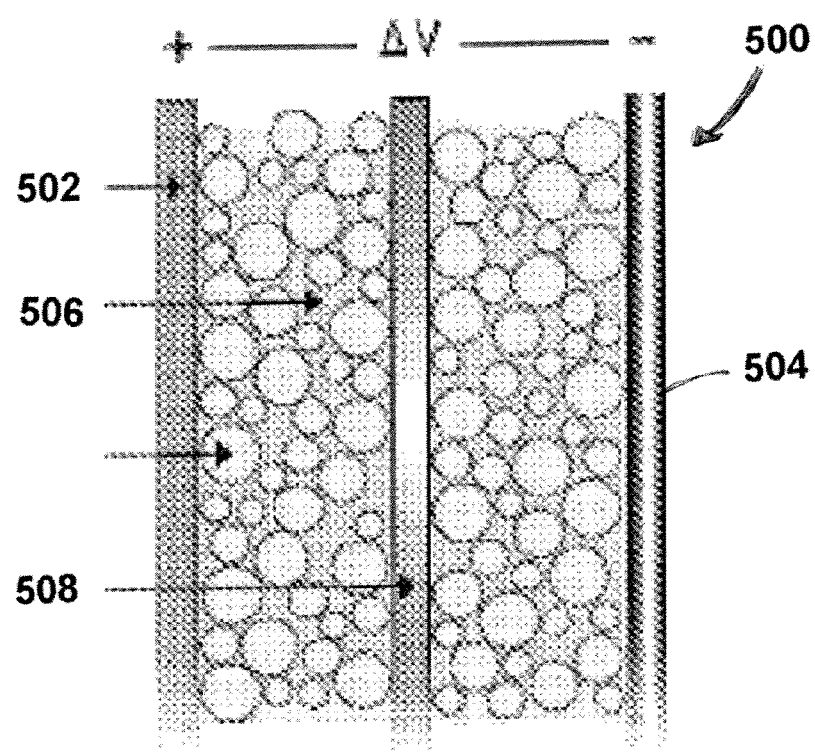
FIG. 20 shows the components of an ultracapacitor cell.

An ultracapacitor cell is shown in FIG. 20. An ultracapacitor cell 500 can be viewed as two nonreactive porous plates or collectors 502, 504 that act as electrodes. An electrolyte 506 is present between the two collectors, as well as a dielectric separator 508 that prevents charge from moving between the two electrodes. In an individual ultracapacitor cell, the applied potential on the positive electrode 502 attracts the negative ions in the electrolyte, while the potential on the negative electrode 504 attracts the positive ions. Cells can be connected in series to form an ultracapacitor bank.

Once an ultracapacitor is charged and energy stored, a load, such as the electrical grid, can use this energy. The amount of energy stored in an ultracapacitor is very large compared to a standard capacitor because of the enormous surface area created by the porous carbon electrodes and the small charge separation (10 angstroms) created by the dielectric separator. In addition, since the rates of charge and discharge are determined solely by its physical properties, the ultracapacitor can release energy much faster (with more power) than a battery that relies on slow chemical reactions.

Because the amount of energy stored in an ultracapacitor is related to the surface area of the electrodes, maximizing the surface area of the electrodes within the available space means the thickness of the dielectric must be minimized. This in turn limits the maximum working voltage of the ultracapacitor. For this reason, ultracapacitors with a capacitance of over 1000 Farads or more may have a working voltage of only a few volts. Ultracapacitor cells may be connected in series or in parallel as needed to meet the required voltages and power discharge rates.

The charge time of an ultracapacitor is about 10 seconds. The ability to absorb energy is, to a large extent, limited by the size of the charger. The charge characteristics are similar to those of an electrochemical battery. The initial charge is very rapid; the topping charge takes extra time. Provision must be made to limit the current when charging an empty ultracapacitor.

In terms of charging method, the ultracapacitor resembles a lead-acid battery. Full charge occurs when a set voltage limit is reached. Unlike an electrochemical battery, the ultracapacitor bank does not require a full-charge detection circuit. Ultracapacitors take as much energy as provided and when full, they stop accepting charge. There is no danger of overcharge or 'memory'.

The ultracapacitor bank can be recharged and discharged virtually an unlimited number of times. Unlike a electrochemical battery, there is very little wear and tear induced by cycling. In normal use, an ultracapacitor cell deteriorates to about 80 percent after 10 years.

Voltage balancing is generally required if more than three capacitors are connected in series. An active balancing circuit has an active switching device, like a bipolar transistor or a MOSFET, connected in series with each bypass element ladder. The switches are controlled by voltage-detection circuits that only turn a switch "on" when the voltage across that particular cell approaches a value just slightly below the continuous working voltage rating of the cell, (the "bypass threshold voltage").

Low voltage ride through (LVRT) is required for power projects over 20 MW. The entire facility must be able to accommodate a 150 millisecond grid disturbance (short or open circuit) and be able to switch back on line. The wind turbine generally measures the voltage on the grid all the time using appropriate systems, and if the voltage falls to 5% below nominal, the turbine shuts down. This is done to prevent wear on the generator, because when voltage drops, the current goes up, creating excess heat.

In embodiments, the wind turbine may also include a dielectric coating to isolate any electronic system from high energy events (such as a lightning strike). The dielectric coating may be located on the wind turbine itself (i.e. the entire structure) or on an interior of a nacelle, where the electronics are typically housed. The dielectric coating may be composed of a suitable resin system, such as a two-part epoxy or urethane system, and a dielectric material, such as mica, glass, or other dielectric materials. Alternatively, the dielectric coating may be composed of non-conducting materials such as oxides of aluminum, titanium, and yttrium. Other materials, alloys, and compounds could be used as well.

The wind turbine may also be equipped with a lightning control system to protect the turbine and the ultracapacitor bank. The lightning control system need only reach the top of the nacelle to protect the electronics. The use of dielectric coatings will also help mitigate the effects of lightning strikes.

Figure 21:
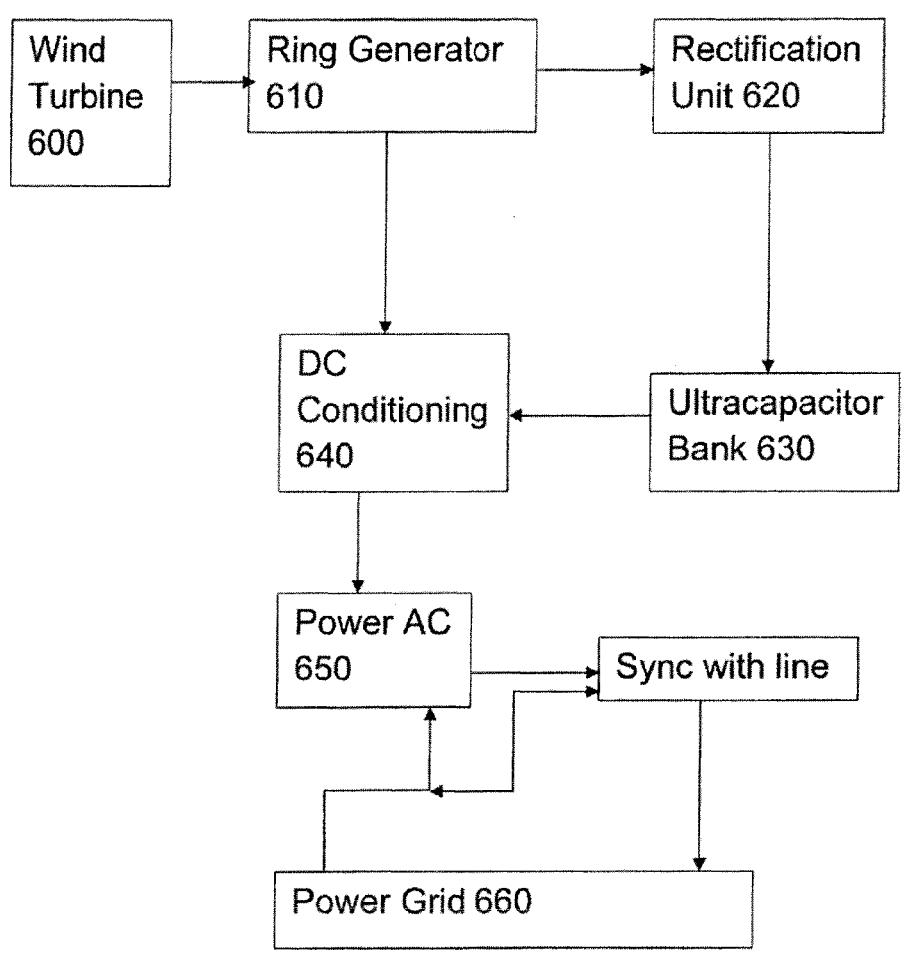
FIG. 21 is a diagram showing the connections between the components of a power generation system with an electrical grid.

FIG. 21 is a diagram showing the interconnection of the various components together. Wind turbine 600 includes ring generator 610. A rectification unit 620 is located to cause one-way current flow from the ring generator to the ultracapacitor bank 630. The ring generator 610 and ultracapacitor bank 630 can send current to be conditioned as direct current (DC) 640, then converted to alternating current (AC) 650 which is sent to the power grid 660.

While particular embodiments have been described, alternatives, modifications, variations, improvements, and substantial equivalents that are or may be presently unforeseen may arise to applicants or other skilled in the art. Accordingly, the appended claims as filed and as they are amended are intended to embrace all such alternatives, modifications, variations, improvements, and substantial equivalents.

The invention claimed is:
1. A power generation system, comprising:
a fluid turbine, the turbine comprising:
a mixer shroud enclosing a rotor/stator assembly, the mixer shroud comprising a ring of mixer lobes located along a downstream end and downstream of the rotor/stator assembly;
the rotor/stator assembly including a rotor and a stator, the stator having a phase winding, the rotor having a central ring, an outer ring, a plurality of rotor blades extending between the central ring and the outer ring, and a plurality of permanent magnets on the outer ring, wherein the mixer shroud includes a ring airfoil encircling the outer ring of the rotor and the plurality of rotor blades, and wherein the ring airfoil includes the stator;
a center body extending through the central ring to support the rotor and configured to remain in a fixed position with respect to the ring airfoil; and
an ultracapacitor bank electrically connected to the fluid turbine.

2. The power generation system of claim 1, wherein the mixer shroud has an airfoil shape.

3. The power generation system of claim 1, further comprising a rectification
unit located between the fluid turbine and the ultracapacitor bank.

4. The power generation system of claim 1, wherein the permanent magnets comprise a rare earth element.

5. The power generation system of claim 1, wherein the permanent magnets are $Nd_2Fe_{14}B$ magnets.

6. The power generation system of claim 1, further comprising a dielectric coating on the fluid turbine.

7. The power generation system of claim 6, wherein the dielectric coating is located on an interior of a nacelle.

8. The power generation system of claim 6, wherein the dielectric coating covers the fluid turbine.

9. The power generation system of claim 6, wherein the dielectric coating comprises a resin and a dielectric material.

10. The power generation system of claim 6, wherein the dielectric coating comprises an oxide of aluminum, titanium, or yttrium.

11. The power generation system of claim 1, further comprising a lightning control system.

12. The power generation system of claim 1, wherein the stator has three phase windings connected in series.

13. The power generation system of claim 1, wherein the plurality of permanent magnets are located along a rear end of the outer ring.

14. The power generation system of claim 1, wherein each mixer lobe has an inner trailing edge angle and an outer trailing edge angle, and the inner angle and the outer angle are independently in the range of 5 to 65 degrees.

15. The power generation system of claim 1, wherein the fluid turbine further comprises an ejector shroud, the downstream end of the mixer shroud extending into an inlet end of the ejector shroud.

16. The power generation system of claim 15, wherein the ejector shroud further comprises a ring of mixer lobes along a downstream end.

17. The power generation system of claim 15, wherein the ejector shroud has an airfoil shape.

18. A process for producing energy, comprising:
providing a fluid turbine including:
a mixer shroud enclosing a ring generator, the mixer shroud comprising a ring airfoil and a ring of mixer lobes located along a downstream end and downstream of the ring generator, the ring generator including:
a rotor having a central ring, an outer ring, a plurality of blades extending between the central ring and the outer ring, and a plurality of permanent magnets on the outer ring, the ring airfoil encircling the outer ring of the rotor and the plurality of blades; and
a stator encircling the rotor and having a phase winding wherein the ring airfoil includes the stator; and
a center body extending through the central ring to support the rotor and configured to remain in a fixed position with respect to the ring airfoil;
exposing the fluid turbine having the ring generator to a fluid stream to generate energy; and
collecting the energy in an ultracapacitor bank.

19. The power generation system of claim 1, wherein the ultracapacitor bank is electrically coupled between the fluid turbine and an electrical grid.

20. The process of claim 18, wherein the ultracapacitor bank is electrically coupled between the fluid turbine and an electrical grid.

* * * * *